(12) United States Patent
Monroe et al.

(10) Patent No.: US 9,842,622 B1
(45) Date of Patent: Dec. 12, 2017

(54) DATA STORAGE DEVICE HAVING IMPROVED READ FAILURE TOLERANCE

(71) Applicant: Western Digital Technologies, Inc., Irvine, CA (US)

(72) Inventors: Albert Monroe, Longmont, CO (US); Scott E. Burton, Westminster, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/582,143

(22) Filed: Dec. 23, 2014

(51) Int. Cl.
*G11B 20/18* (2006.01)
*G11B 5/012* (2006.01)
*G11B 20/10* (2006.01)

(52) U.S. Cl.
CPC .......... *G11B 20/1889* (2013.01); *G11B 5/012* (2013.01); *G11B 2020/10898* (2013.01)

(58) Field of Classification Search
None
See application file for complete search history.

(56) References Cited

U.S. PATENT DOCUMENTS

| | | | |
|---|---|---|---|
| 5,418,940 A | 5/1995 | Mohan | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |

(Continued)

*Primary Examiner* — Brian Butcher
(74) *Attorney, Agent, or Firm* — Barry IP Law

(57) ABSTRACT

Systems and methods for improving read failure tolerance during read-modify-write operations of data storage systems accommodating a host that uses a logical sector of a size smaller than the physical sector size of the data storage system. In one embodiment, the data storage system can perform sector indirection in response to a read error during a read-modify-write command.

20 Claims, 16 Drawing Sheets

(56) References Cited

U.S. PATENT DOCUMENTS

| | | |
|---|---|---|
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,080,200 B2 | 7/2006 | Hassner et al. |

(56) References Cited

U.S. PATENT DOCUMENTS

| | | |
|---|---|---|
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,219,259 B2 | 5/2007 | Batchelor et al. |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,574,558 B2 | 8/2009 | Morley et al. |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,024,515 B2 | 9/2011 | Auerbach et al. |
| 8,040,625 B1 | 10/2011 | Boyle et al. |
| 8,055,858 B2 | 11/2011 | Venturi |
| 8,074,113 B2 | 12/2011 | Kompella et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |

(56) References Cited

U.S. PATENT DOCUMENTS

| | | |
|---|---|---|
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2006/0028947 A1 | 2/2006 | Elliott et al. |
| 2006/0028948 A1 | 2/2006 | Batchelor et al. |
| 2006/0031601 A1 | 2/2006 | Elliott et al. |
| 2006/0031630 A1 | 2/2006 | Batchelor et al. |
| 2006/0031714 A1 | 2/2006 | Batchelor et al. |
| 2009/0021853 A1 | 1/2009 | Park |
| 2009/0113702 A1 | 5/2009 | Hogg |
| 2010/0079904 A1 | 4/2010 | Sato |
| 2010/0232048 A1* | 9/2010 | Aida ............ G11B 5/09 360/48 |
| 2010/0232049 A1* | 9/2010 | Kompella ....... G06F 3/0608 360/55 |
| 2010/0306551 A1 | 12/2010 | Meyer et al. |
| 2011/0226729 A1 | 9/2011 | Hogg |
| 2011/0292536 A1* | 12/2011 | Hongawa ........ G11B 5/012 360/55 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

US 9,842,622 B1

DATA STORAGE DEVICE HAVING IMPROVED READ FAILURE TOLERANCE

TECHNICAL FIELD

This disclosure relates to information storage and, more particularly, to systems and methods for operating data storage systems with an addressing scheme with a sector size different than that of a host system.

BACKGROUND

Many computing systems generate or receive data that may be desirable to store for a period of time. These computing systems often utilize a data storage device for data storage and retrieval. In many cases, a data storage device can include one or more physical media (e.g., magnetic platters, flash storage, etc.) that is subdivided into a number of physical regions or "sectors." Each sector can be sized to store a fixed number of bytes which defines the minimum unit with which data can be read, modified, or written to the physical media. In this manner, the physical sector size implemented within a data storage device influences the addressing structure used to access data from the physical media of that data storage device. As such, communication between a computing system ("host") and a data storage device typically takes place in sector-sized blocks of data.

However, certain hosts may issue instructions and/or commands using a sector size that is smaller than the physical sector size implemented by certain data storage devices. For example, a host may issue instructions in 512-byte blocks of data ("512" sector) to a data storage device implemented with 4,096 bytes per physical sector ("4K" sector). In such cases, the 4K data storage device may be required to emulate a 512-byte sector interface in order to successfully communicate with the 512 host. Emulation, in turn, can increase the complexity of the data storage device while also negatively impacting the performance and/or reliability thereof.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Figure 1:
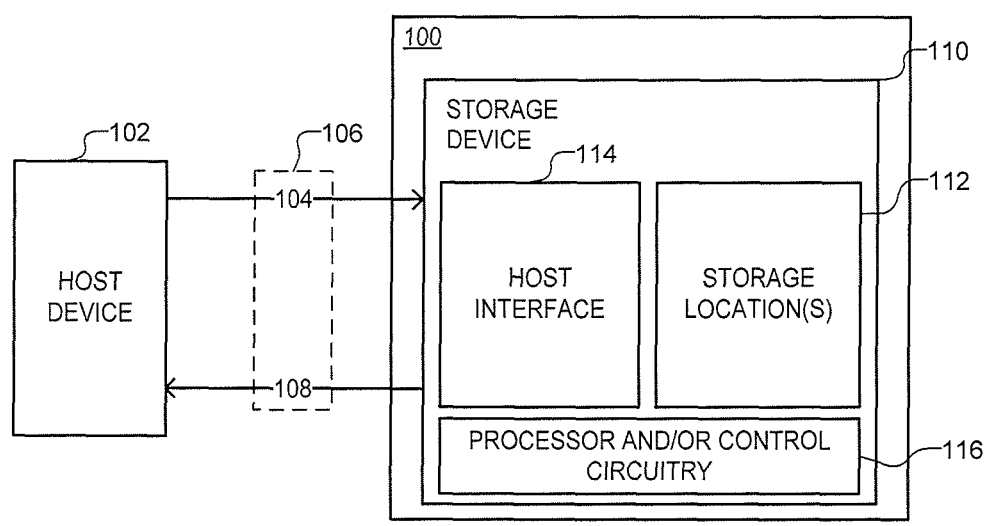
FIG. 1 depicts a simplified block diagram of an example data storage system that may be configured to communicate with a host device using logical sectors of a different size than the physical sectors of the data storage system.

Some embodiments described herein relate to data storage systems and data storage devices and methods of operating the same. It should be appreciated that the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others. For example, although many embodiments described herein often reference to hard disk drives ("HDD") containing one or more magnetic recording disks, other physical media and data storage devices such as solid state drives ("SSD"), flash storage devices, tape storage devices, hybrid storage devices, optical storage devices, and the like may be equally applicable to one, many, or all embodiments described herein or variants thereof.

Many data storage systems and devices described herein include one or more physical media to record data non-volatilely. For example, a HDD can include a rotating disk formed from a magnetic material into which data can be recorded as a pattern of magnetic polarity. In such cases, a write head can save data to the magnetic material in response to a write instruction from a host device, and a read head can read data from the magnetic material in response to a read instruction from the host device. In some examples, the write head and read head can be implemented as the same component.

The physical media of a data storage device can be subdivided into a number of independent regions or "sectors." Subdividing physical media into sectors can simplify read/write hardware, decrease complexity of addressing data for storage and retrieval, improve data integrity by localizing error detection and correction, improve the performance of the data storage device (e.g., read, write, seek times), and so on. Data sectors of a storage system may be generally referred to as "storage" sectors or "physical" sectors.

Often, all storage sectors of a physical media can be of the same size, although this is not necessarily required. For example, a data storage device capable to store 2,048 megabytes ("MB") of data can be divided into two equal storage sectors each containing 1,024 MB. Thereafter, the data storage device can associate each physical sector with a unique logical address ("LA"), such as LA-0 and LA-1. In this example, when a host device submits a read instruction for LA-1 to the data storage device, the data storage device reads the second 1,048 MB sector and returns 1,048 MB of data to the host.

One may appreciate that as sector size decreases, the number of physical sectors increases. For example, a 2,048 MB data storage device implementing 512-byte sectors will have 524,288 physical sectors.

In certain cases, sectors of relatively small size may be favored. For example, certain data storage device embodiments can implement smaller sectors in order to efficiently store and retrieve small files. For example, it may be more efficient to access a 128-byte file contained within a 512 sector than it would be to access the same file contained within a 4K sector. In another example, small sectors may be used to localize error detection and correction in order to improve data integrity within the data storage device. For example, one or more bytes of a sector having a soft error (e.g., write error without physical media damage) may cause all data contained within that sector to be marked as unreadable and/or undependable data, even if the sector contained mostly valid data. To account for this circumstance, many data storage device embodiments implement error correction coding ("ECC") to attempt to correct for errors within a particular sector. Although ECC may require additional space within the data storage device, per-sector error correction can improve reliability of many data storage device embodiments. In this manner, as sector size decreases, errors affect a smaller amount of adjacent data.

In other cases, larger storage sectors may be favored over smaller storage sectors. In certain embodiments, larger storage sectors may be implemented for improved data density. For example, ECC implemented with a single 4K sector may occupy less additional space than ECC implemented for eight independent 512 sectors. In other embodiments, larger storage sectors may be implemented in order to efficiently store and retrieve large files. For example, it may be more efficient to access a 4,096-byte file contained within a single 4K sector than it would be to access the same file contained within eight 512 sectors. In this manner, as sector size increases storage density and large-file read/write efficiency can also increase.

Although different embodiments can implement different physical sector sizes for different reasons, it can be appreciated the physical sector size of a particular embodiment often strongly influences the addressing structure (and communication protocol) used by a host to read or write data to the physical media of the data storage device. As a result, communication between a host device and a data storage device conventionally takes place in sector-sized blocks of data. Furthermore, because a host and data storage device must conform to the same addressing structure for successful two-way communication, both the host and data storage device can conventionally only read or write data in multiples of sector-sized blocks. As a result, the size of a host sector is conventionally the same size as the physical sector of the data storage.

However, certain hosts may operate with logical sectors having a smaller size than the physical sector implemented by a data storage device to which the host is coupled.

Accordingly, as used herein, in the context of a data storage device and a host device having different sector sizes, the terms "host" sectors and "logical" sector and similar phrasing refers to sector sizes used by a host device. A typical example of a host sector may be a 512-byte sector although in other embodiments, a host sector can take other sizes and/or can depend upon on a number of factors including, for example, one or more operating systems, software programs, or hardware associated with the host.

Also as used herein, in the context of a data storage device and a host having different sector sizes, the terms "storage" sectors and "physical" sectors and similar phrasing refers to sector sizes that are larger than the host logical sector. For example a storage sector can be at least double the size of a host sector, and in many cases, several integer multiples larger than a host sector. For example, 1,024-byte sectors, 2,048-byte sectors, 4,096-byte sectors, 8,192-byte sectors, 65,536-byte sectors, and so on may all be considered larger "storage" sectors. A typical example of a storage sector may be a 4K sector.

For embodiments in which a smaller-sector host is coupled to a larger-sector data storage device, the data storage device may be required to emulate the interface expected by the host by translating smaller sector instructions into larger sector equivalents. For example, in certain embodiments, a 4K data storage device can translate 512 sector instructions into 4K sector instructions prior to executing those instructions.

For interface emulation embodiments, each storage sector can be subdivided via software and/or hardware into sub-sectors corresponding to the size of the smaller sector that the storage device is configured to emulate. For example, when coupled to a 512 host, each storage sector of a 4K data storage device can be emulated as eight separate 512 logical sectors and mapped to the logical address ("LA") protocol expected and used by the host. More specifically, a 4K sector can have bytes 1 through 512 associated with LA-0, bytes 513 through 1024 associated with LA-1, and so on. In this manner, if the 512 host issues a read instruction for logical sectors at LA-0 through LA-7, the data storage device can read the 4K sector and return the requested 4,096 bytes, broken into eight separate blocks.

However, in some cases, a smaller sector host can issue a write instruction including one or more logical sectors that are not aligned to a physical sector boundary within the data storage device. For example, a smaller sector host may periodically request to write to a logical sector that corresponds to only a portion (e.g., interior) of a physical sector. In other cases, a smaller sector host may periodically request to write to a number of logical sectors that happen to overlap a physical sector boundary. In either case, at least one physical sector will not be fully populated with new data after the write instruction completes. Accordingly, any host-supplied new data (e.g., divided into logical sectors) that corresponds to only a portion of a storage sector is referred to hereinafter as "runt" data. The remaining portions of the storage sector that contain old data that should not be over-written by writing runt data are referred to hereinafter as "missing runt" data.

In many embodiments, in order to preserve missing runt data when writing a runt to a storage sector, a data storage system must first read the entire storage sector, modify the storage sector to include the runt, and write the entire storage sector back to the physical media. Such an operation is referred to hereinafter as a "read-modify-write" operation.

For one illustrative example of a read-modify-write operation, a 512 host may be coupled to a 4K data storage device containing a first and second 4K sector, emulated by the data storage device as sixteen separate logical addresses mapped as LA-0 through LA-15 such that the first 4K sector corresponds to LA-0 through LA-7 and the second 4K sector corresponds to LA-8 through LA-15.

In this example, in response to a write instruction to runt LA-2, the data storage device must first obtain the missing runt data (hereinafter "missing runt read") by reading the first 4K sector entirely to obtain missing runt bytes associated with LA-0, LA-1, and LA-3 through LA-7. Thereafter, the data storage device can modify bytes 1,537 through 2,048 of the first 4K sector (corresponding to LA-2). Lastly, the data storage device can write the first 4K sector back to the physical media, containing both the new runt data and the old missing runt data. In this manner, missing runt bytes 1 through 1,536 and missing runt bytes 2,049 through 4,096 are retained during a write process of runt data to the first 4K sector. In this example, a single read-modify-write operation is performed on the first 4K sector in response to the write instruction from the smaller sector host to emulated address LA-2.

Continuing the example above, in response to a write instruction to LA-1 through LA-8, the data storage device must perform two read-modify-write operations because two missing runt reads (one for each of the first and second 4K sectors) are required. For example, in this embodiment, the data storage system performs two missing runt reads, modifies runt bytes 513 through 4,096 of the first 4K sector, modifies runt bytes 1 through 512 of the second 4K sector, and writes both the first and second 4K sectors back to the physical media. Thus, in this case, two read-modify-write operations are performed in response to the write instruction from the smaller sector host to emulated addresses LA-1 through LA-8.

In many cases, however, a read-modify-write operation can fail and/or cause noticeable performance degradation if the targeted storage sector contains one or more errors that require correction and/or conditioning prior to modifying or writing data. For example, a storage sector that is emulated to represent several small sectors may contain an error in need of correction. In these cases, error correction may be required prior to writing runt data so that missing runt data can be properly read as a portion of the required read-modify-write operation.

In other cases, environmental or temporary events can cause a missing runt read error, despite that the physical media does not contain any errors. For example, in certain cases a data storage device can experience an external force (e.g., impact event, power fluctuation, etc.) during a missing runt read that causes a read error, which in turn can necessitate that the missing runt read operation repeats.

In other cases, the physical media may contain an uncorrectable error. For these examples, a data storage device may be required to perform a flag operation that flags or marks the sector containing an uncorrectable error as a bad sector.

Regardless whether a missing runt read error is temporary, correctable, or permanent, the error can cause a data storage device to initiate a high-latency data recovery process, bad sector flagging process, and/or a repeated read operation prior to performing any subsequent tasks.

Accordingly, many embodiments described herein relate to sector indirection and read/write bifurcation of one or more sectors of a data storage device upon receiving a missing runt read error during a read-modify-write operation required by the data storage device's emulation of a smaller sector host interface.

For example, many embodiments described herein are configured, upon receiving a missing runt read error, to write runt data to an auxiliary location without performing any read, write, or maintenance operations on the originally-targeted sector. In these embodiments, subsequent read instructions from a host device to the runt area are directed to the auxiliary location whereas subsequent read instructions from the host to the missing runt area are still directed back to the originally-targeted sector. As a result, for many embodiments, missing runt read errors that are caused by environmental or otherwise temporary events and/or conditions are effectively automatically ignored with no performance degradation. Additionally, for these embodiments, any missing runt read errors that are caused by correctable or permanent physical media errors can be ignored during a runt write operation so as to delay correction of the errors (e.g., ECC processes) or flagging of the sector as a bad sector, until after the runt write operation completes. In other words, for these embodiments, failure analysis, error detection, and error correction for the originally-targeted sector can occur asynchronously with respect to the runt write instruction received from the host.

In addition, for these and other embodiments, write requests to a missing runt area of an originally-targeted sector are directed to the auxiliary location where the runt was written. In this manner, once all missing runt areas contain new data from the host, the auxiliary location can be copied back to the originally-targeted sector, or, in some embodiments, the addresses of the auxiliary location and the originally-targeted sector can be swapped.

As a result, for many embodiments described herein, a host device will not experience write latencies even if that host attempts to write to a logical sector that triggers a missing runt read error.

FIG. 1 depicts a simplified block diagram of an example data storage system 100 configured to communicate with a host device 102. The host device 102 may be any suitable electronic device such as a laptop computer, desktop computer, server, cellular phone, tablet computer, and so on. In some embodiments, the host device 102 can be implemented as a system of individual electronic devices, for example, as a network of servers.

The host device 102 can send one or more instructions 104 over a physical connection (or wirelessly) to the data storage system 100. The instruction(s) 104 can be any number of suitable instructions including, but not necessarily limited to, write instructions, erase instructions, and/or read instructions. In many embodiments, the instructions 104 may conform to a particular protocol 106. In some cases, the protocol 106 can define a particular number of bytes to be exchanged between the host device 102 and the data storage system 100. For example, in many embodiments, the host device 102 can be configured to request and receive data in 512-byte blocks. In other embodiments, the host device 102 can be configured to request and receive data in another block size.

Upon receiving an instruction 104, the data storage system 100 may return a response 108. In many embodiments, the response 108 may be in the same format and/or may conform to the same protocol as the instruction 104. For one example, if the host device 102 sends an instruction 104 to read data from the data storage system, the data storage system 100 can send a response 108 including the requested data, conforming to the protocol 106.

The data storage system 100 can include a storage device 110. In many examples, the storage device 110 can include one or more physical media such as a storage location 112. For example, the storage location 112 can include one or more circular recording disks made from a magnetic material onto (and/or into) which data can be recorded as patterns of magnetic polarity. In other embodiments, the storage location 112 can include another type of physical media such as flash storage, optical storage, tape storage, and the like.

In some embodiments, the storage location 112 can be apportioned into one or more physical sectors that are larger (e.g., 4K sectors) than the blocks of data exchanged through the protocol 106 (e.g., 512 sectors).

In these embodiments, the data storage system 100 can include a host interface 114 that can be configured to serve as an intermediary between the host device 102 and the storage location 112. For example, the host interface 114 can be configured to translate logical sector commands 104 (conforming to the protocol 106) into storage sector commands suitable for operating the storage location 112. In addition, the host interface 114 can be configured to translate storage sector responses from the storage location 112 into logical sector responses 108 (conforming to the protocol 106) suitable for sending to the host device 102.

The host interface 114 can be implemented as a controller, as an electrical circuit, as an integrated circuit, as a series of instructions executed by a processor 116, or as a combination thereof. In many embodiments, the host interface 114 can perform and/or coordinate one or more operations of the storage device 110, the storage location 112, and/or data storage system 100.

In many embodiments, the host interface 114 can be configured to perform read, write, and modification operations on the storage location 112. For example, as described above, a smaller sector host, such as the host device 102, may be configured in certain embodiments, to send a write instruction that requires writing runt data to a portion of a larger physical sector. Also as noted above, a read-modify-write operation may be required to preserve missing runt data already within the targeted physical storage sector. Accordingly, in many embodiments, the host interface 114 can be configured to perform and/or coordinate read-modify-write operations to the storage location 112 in response to instructions 104 sent from the host device 102 that require writing of runt data to a particular physical sector.

In addition, the host interface 114 can be configured to perform sector indirection and/or read/write bifurcation of one or more physical sectors of the storage location 112 in response to receiving a missing runt read error generated by the storage location 112 in the process of executing a read-modify-write operation. For example, in certain embodiments, a logical sector instruction 104 can be received from the host device 102 (after translation to a storage sector instruction by the host interface 114) that requires writing of one or more runts to one or more physical sectors of the storage location 112 that yield a missing runt read error. Thus, in response to a missing runt read error, the host interface 114 can perform and/or coordinate redirection of runt data to an auxiliary sector instead of the originally-targeted sector. For example, the host interface 114 can be configured (upon receiving a missing runt read error from the storage location 112) to write runt data received from the host device 102 to an auxiliary location instead of performing a conventional read-modify-write operation on the originally-targeted sector.

FIGS. 2A-3H each illustrate different stages and/or states of interaction between a host device and a data storage system in accordance with various embodiments described herein. It is understood that the sequence of figures is not intended to limit the disclosure to a single preferred embodiment, order of operations, or required sequence of states. Furthermore, it can be appreciated that although the process of emulation by a data storage system is illustrated showing a byte-to-byte translation scheme (e.g., byte locations within host sectors correspond to byte locations within portions of storage sectors), such a scheme is not necessarily required or favored in all embodiments. For example, certain data storage system embodiments may encrypt, encode, or otherwise modify data prior to writing data to the physical media. In these examples, a byte-to-byte translating scheme, such as illustrated, may not be appropriate. Accordingly, it is understood that the byte-to-byte translation illustrated by FIGS. 2A-3H is presented as one example, and other host sector to storage sector translation schemes or addressing structures may be used.

Figure 2A:
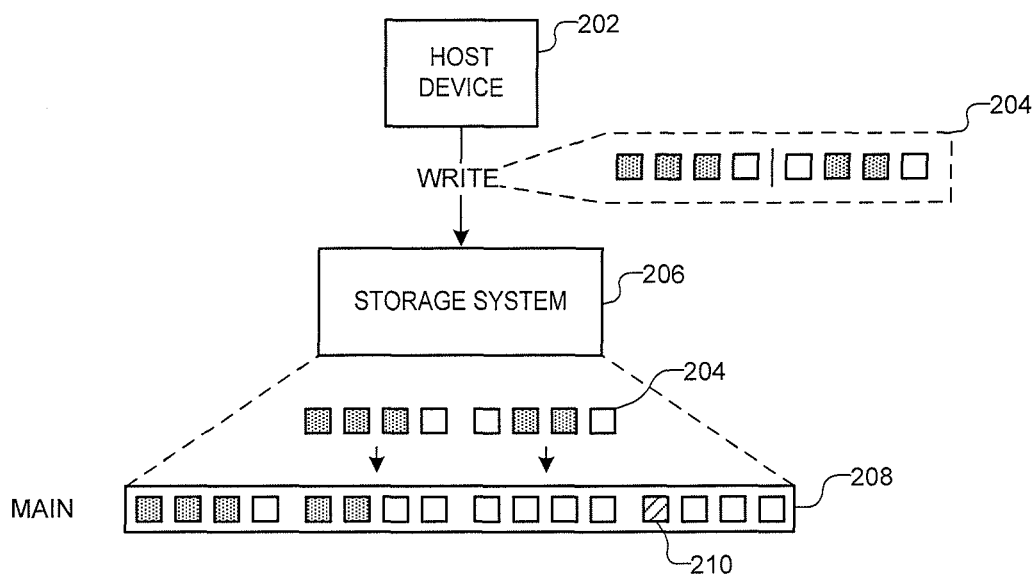
FIG. 2A depicts a simplified signal flow diagram of a data storage system receiving a write instruction to the interior of a physical sector containing a media defect from a host device.

FIG. 2A depicts a simplified signal flow diagram of a host device 202 sending a logical sector write instruction 204 to a data storage system 206. As illustrated, the logical sector write instruction 204 includes two logical sectors, each containing four blocks of data. Within the data storage system 206, however, a storage sector 208 may include sixteen blocks of data. In the illustrated embodiment, the storage sector 206 can be emulated to the host device 202 as four logical sectors.

The logical sector write instruction 204 is illustrated as a runt. More particularly, the logical sector write instruction is illustrated as containing two logical sectors directed to be written within the storage sector 208.

As noted above, the data storage system 206 may be required to read or write the entire storage sector 208 in a single operation. In other words, the data storage system 206 cannot write to the middle portions of the storage sector 208. Accordingly, in order to write runt data corresponding to the logical sector write instruction 204, a read-modify-write operation must be performed.

However, in some embodiments, the storage sector 208 may include a defect 210 that can cause an error upon executing the read-modify-write operation. In other words, the defect 210 can trigger a missing runt read error. As noted above, a missing runt read error may be caused by any number of issues (including the defect 210) that may be temporary, correctable, or permanent. In one example, a missing runt read error can be triggered by a temporary event, such as an environmental condition. In other examples, a missing runt read error can be triggered by a correctable defect within the storage sector 208. In still further examples, a missing runt read error can be triggered by an uncorrectable error such as a defect present within the physical media of the storage sector 208.

Figure 2B:
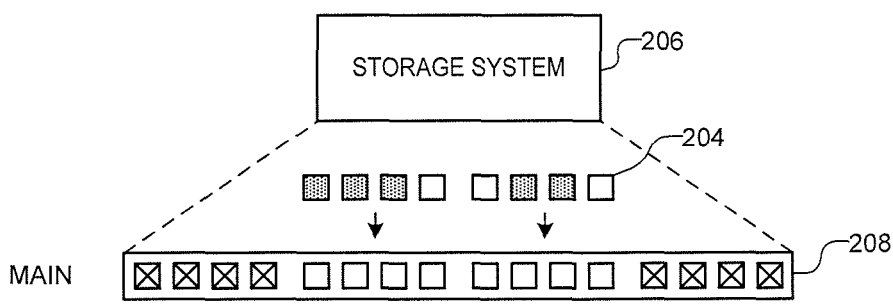
FIG. 2B depicts the data storage system of FIG. 2A, illustrating potential loss of data resulting from a read failure during a read-modify-write operation.

In response to the missing runt read error resulting from the defect 210, the data storage system 206 may, in certain embodiments, mark missing runts within the storage sector 210 as invalid data (because the missing runts were not successfully read from the original-targeted storage sector 208 due to the missing runt read error) while writing runt data corresponding to the logical sector write instruction 204, for example as shown in FIG. 2B.

Figure 2C:
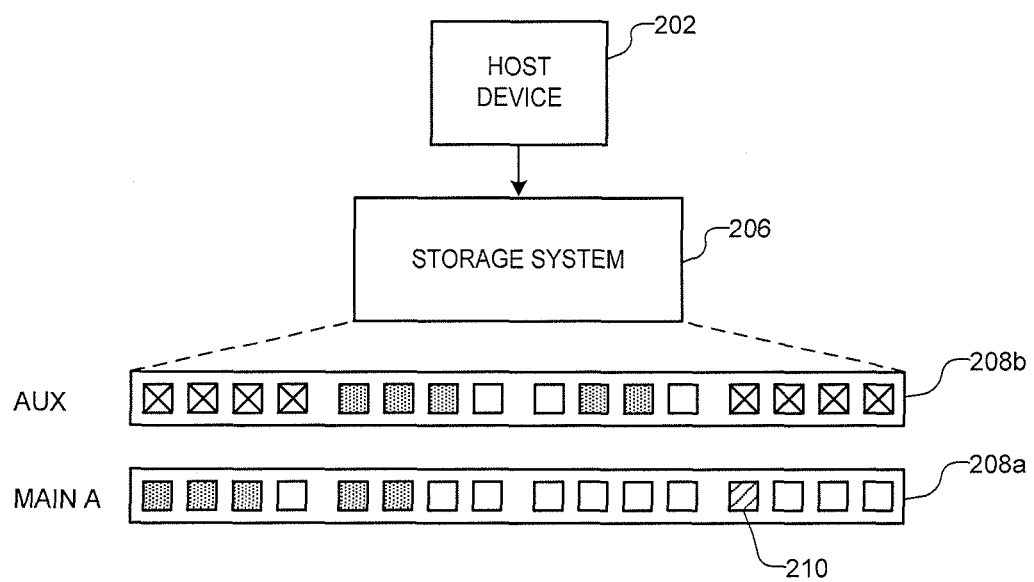
FIG. 2C depicts the data storage system of FIG. 2A implementing sector indirection to prevent data loss during a read-modify-write operation.

Alternatively, in response to the missing runt read error resulting from defect 210, the data storage system may, in certain embodiments, write the runt data corresponding to the logical sector write instruction 204 to an auxiliary sector 208*b* marking the missing runt portions (which were not successfully read from the original-targeted storage sector 208*a* due to the missing runt read error) as invalid data and leaving the original-targeted storage sector 208*a* unchanged, such as shown in FIG. 2C. In the embodiment illustrated in FIG. 2C, the missing runt portions of the original-targeted storage sector 208*a* are unmodified, although the defect 210 remains. As a result, any read instructions directed to the original-targeted storage sector 208*a* will fail as a result of the defect 210 unless and until the defect 210 can be eliminated in a subsequent error correction process.

As may be appreciated, the embodiments presented in FIGS. 2A-2C present a risk of data loss in certain circumstances. More specifically, if a missing runt read error persists while attempting to read data from the storage sector 208, the missing runt data may be permanently lost.

FIGS. 3A-3H each illustrate different stages and/or states of interaction between a host device 302 and a data storage system 308 in accordance with various embodiments described herein. It is understood that the sequence of figures is not intended to limit the disclosure to a single preferred embodiment, order of operations, or required sequence of states. To the contrary, these illustrations, and the sequence in which they are presented are meant only as examples and, accordingly, are not necessarily exhaustive of all possible combinations of states and/or stages of interaction between the elements, embodiments, features, structures, function, methods, and/or apparatuses possible within the spirit of the disclosure.

Figure 3A:
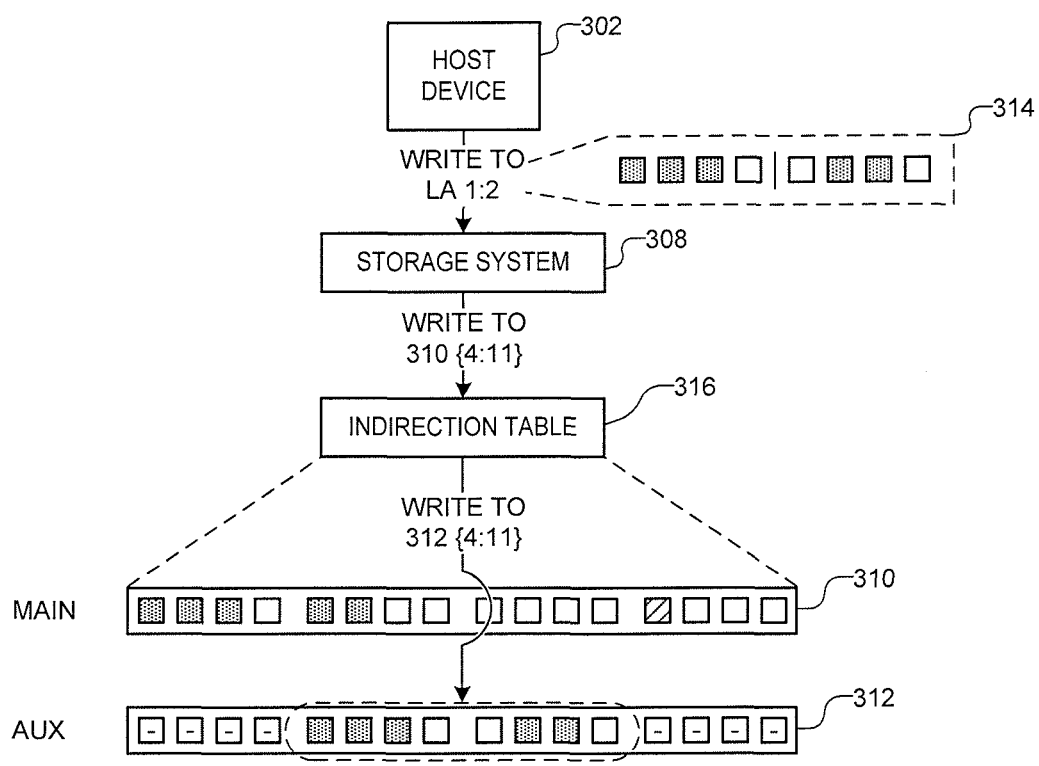
FIG. 3A depicts a simplified signal flow diagram of a data storage device implementing sector indirection upon receiving a write instruction to the interior of a physical sector from a host device.

FIG. 3A depicts a simplified signal flow diagram of a host device 302 sending a logical sector write instruction 314 to a data storage system 308. As with FIGS. 2A-2C, the logical sector write instruction 314 can include or correspond to runt data to be inserted into the interior of a storage sector 310. As illustrated, the runt data corresponding to the logical sector write instruction 314 may be associated with one or more logical addresses, such as LA-1 and LA-2. As described with respect to other embodiments disclosed herein, a logical address used by a host device 302 can be translated by a data storage system, such as the data storage system 308, into a particular byte range within a storage sector 310. For example, as illustrated, the runt data corresponding to the logical sector write instruction 314 can be associated (by the storage sector storage system 308) with blocks 4 through 11 of the storage sector 310.

As mentioned with respect to other embodiments describe herein, certain data storage systems, such as the data storage system 308, can perform sector indirection upon receiving a missing runt read error. For example, as illustrated in FIG. 3A, the data storage system 308 may detect a missing runt read error and, in response, write the runt data to an auxiliary sector 312, leaving the originally-targeted storage sector 310 unaltered. As illustrated, the data storage system 308 writes the runt data to blocks 4 through 11 of the auxiliary sector 312.

In some embodiments and as illustrated, the auxiliary sector 312 may be the same size as the originally-targeted storage sector 310, although for certain embodiments this may not necessarily be required. For example, in certain embodiments, the auxiliary sector 312 may be larger than the originally-targeted storage sector 310, or, in alternate embodiments, the auxiliary sector 312 can be smaller than the originally-targeted storage sector 310. Further, in some embodiments the auxiliary sector 312 may include a different physical media than the originally-targeted storage sector 310. For example, in some embodiments, the auxiliary sector 312 may include solid state storage whereas the originally-targeted storage sector 310 may be a magnetic platter.

Also as mentioned with respect to other embodiments described herein, certain data storage systems, such as the data storage system 308, can perform read indirection upon receiving a missing runt read error. For example, the indirection table 316 can be configured to direct subsequent read requests from the host device 302 of the runt data to the auxiliary sector.

Figure 3B:
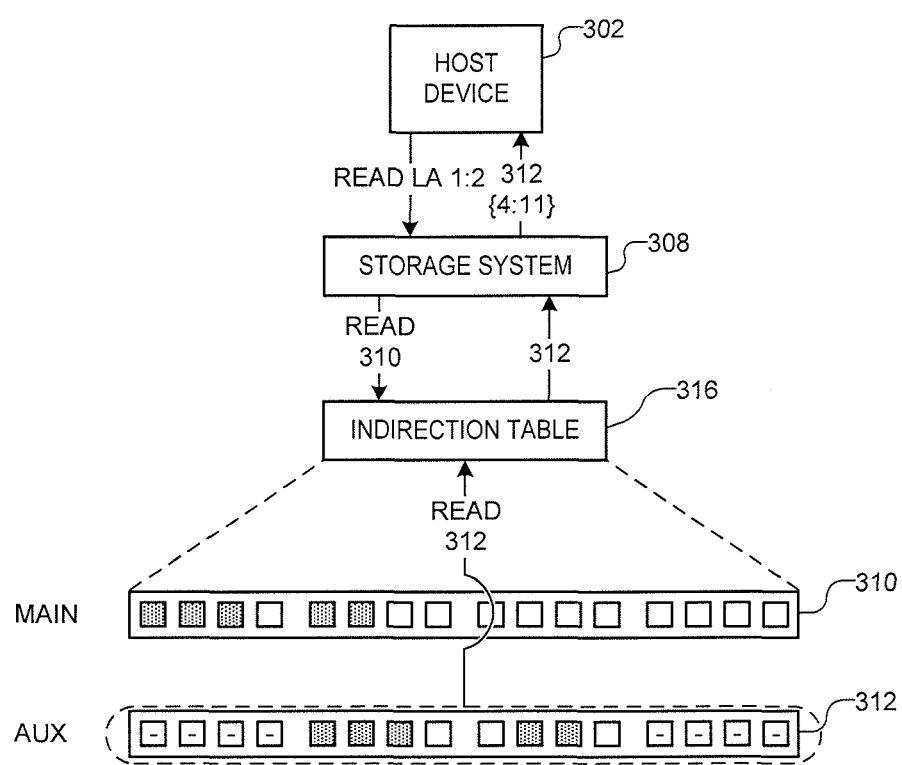
FIG. 3B depicts a simplified signal flow diagram of the data storage device of FIG. 3A receiving a read instruction from the interior of a physical sector from the host device.

For example, FIG. 3B illustrates the data storage system 308 responding to a read request for logical sector LA-1 and LA-2, sent from the host device 302 after the runt data has been written to the auxiliary sector in FIG. 3A. As illustrated, after accessing the entire auxiliary sector 312, the data storage system 308 filters the data to only those blocks that correspond to the logical sector request from the host device 302. In the illustrated embodiment, this corresponds to blocks 4 through 11 of the auxiliary sector 312. In this manner, the data storage system 308 performs a redirection of write requests that would ordinary be associated with the originally-targeted storage sector 310 to the auxiliary sector 312. In other words, the indirection table 316 redirects runt read requests to the auxiliary sector 312.

Figure 3C:
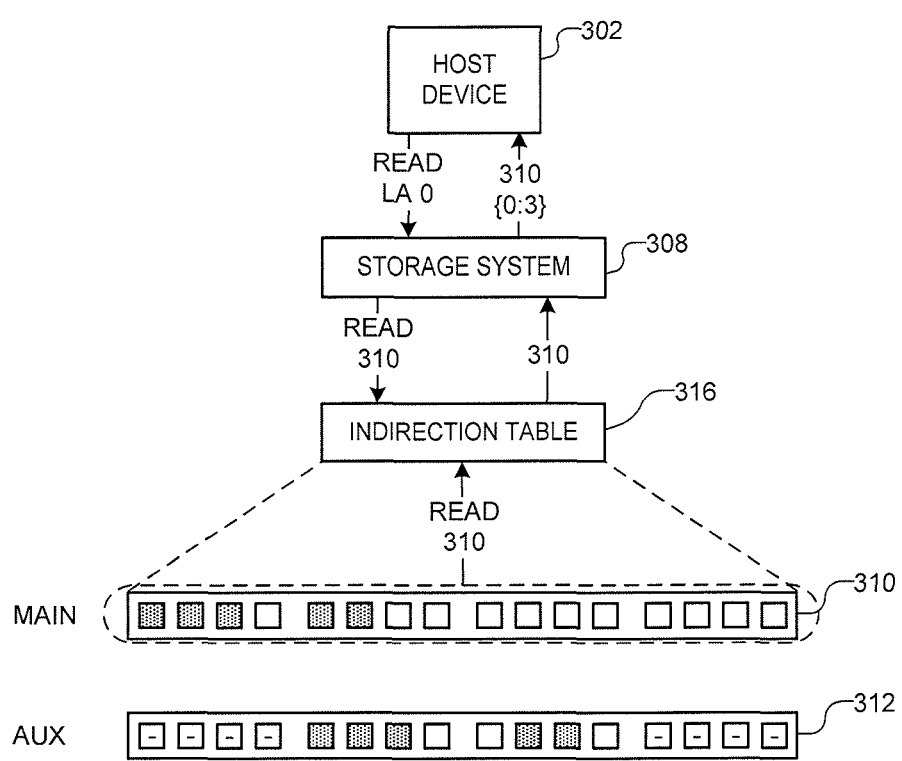
FIG. 3C depicts a simplified signal flow diagram of the data storage device of FIG. 3A implementing sector read-indirection upon receiving a read instruction to different portion of the interior of the physical sector.

However, in the case that the host device 302 submits a read instruction to a sector that was associated with the missing runt (e.g., LA-0 or LA-3 in FIGS. 3A-3B), the indirection table 316 may access the originally-targeted storage sector 310. In this manner, if the defect that triggered the original missing runt read error was temporary (see, e.g., the defect in block 12 of storage sector 310 of FIG. 3A is not present in FIG. 3B-3C), the missing runt that is requested and expected will be returned to the host device 302 as shown in FIG. 3C. More specifically, as shown in FIG. 3C, blocks 0 through 3 of the originally-targeted storage sector 310 are returned in response to a request from the host device to read logical address LA-0.

Alternatively, if the defect that triggered the original missing runt read error remains present within the storage sector 310 for a subsequent read of the missing runt (e.g., the source of the error is not temporary and is either correctable or uncorrectable), a standard error correction routine (e.g., ECC) may be initiated. In this manner, if the error is correctable and is corrected via the standard error correction routine, subsequent read requests to the missing runt area of the originally-targeted storage sector 310 may be successfully read as shown in FIG. 3C.

For some embodiments described herein, certain data storage systems, such as the data storage system 308, can perform write indirection upon receiving a missing runt read error. For example, after receiving a missing runt read error and writing runt data to an auxiliary sector, such as shown in FIG. 3A, the data storage system 308 can direct subsequent write commands to missing runt areas to the auxiliary sector, such as shown in FIG. 3D.

Figure 3D:
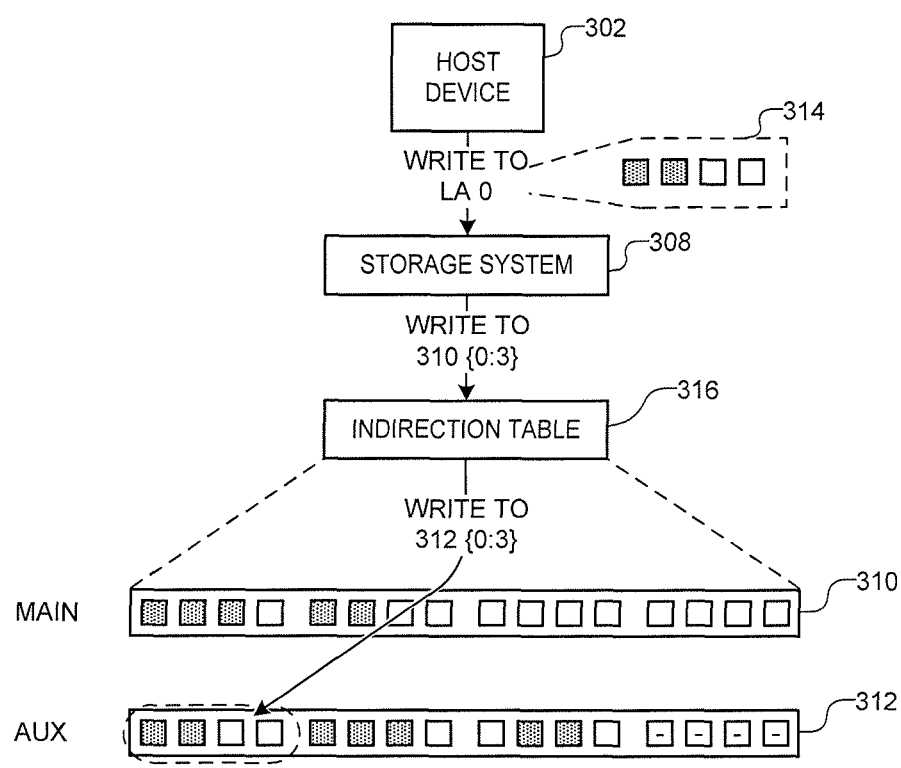
FIG. 3D depicts a simplified signal flow diagram of the data storage device of FIG. 3A implementing sector write-indirection upon receiving a write instruction to different portion of the interior of the physical sector.

As illustrated in FIG. 3D, the host device 302 can issue a write command to write data to a logical address LA-0 which the data storage system 308 can write, via the indirection table 316, to blocks 0 through 3 of the auxiliary sector 312. In this manner, read commands and write commands to the missing runt section are bifurcated; read commands directed to the missing runt are directed via the indirection table 316 to the originally-targeted storage sector 310 whereas write commands directed to the missing runt are directed, via the indirection table 316, to the auxiliary sector 312.

Figure 3E:
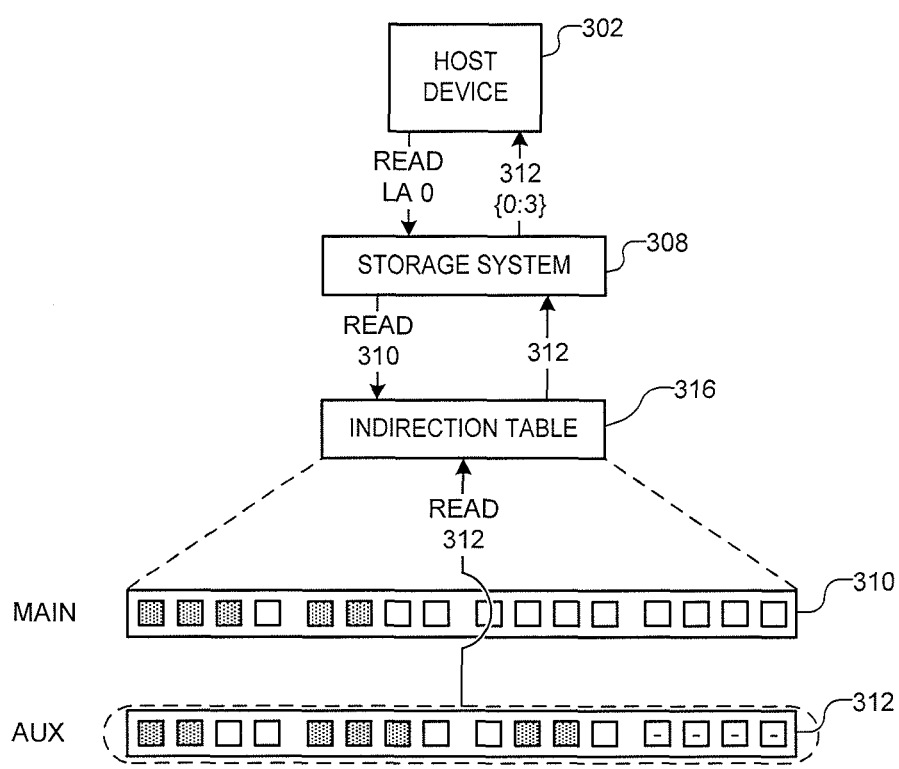
FIG. 3E depicts a simplified signal flow diagram of the data storage device of FIG. 3A implementing sector read-indirection upon receiving a read instruction from the interior of a physical sector.

For some embodiments described herein, certain data storage systems, such as the data storage system 308, can perform follow-up read indirection to missing runt areas that contain new data, as shown in FIG. 3E. For example, after a missing runt area is written to an auxiliary location 312 in an operation such as that shown in FIG. 3D, subsequent read requests for the same missing runt area can be directed to the auxiliary location 312 instead of the originally-targeted storage sector 310 as shown in FIG. 3C. More specifically, as shown in FIG. 3E, after writing to logical address LA-0 in FIG. 3D, the host device 302 can issue a read request for the same logical address LA-0. As shown in FIG. 3E, the indirection table 316 may direct this read request to the auxiliary sector 312, specifically returning, to the host device 302, blocks 0 through 3.

Figure 3F:
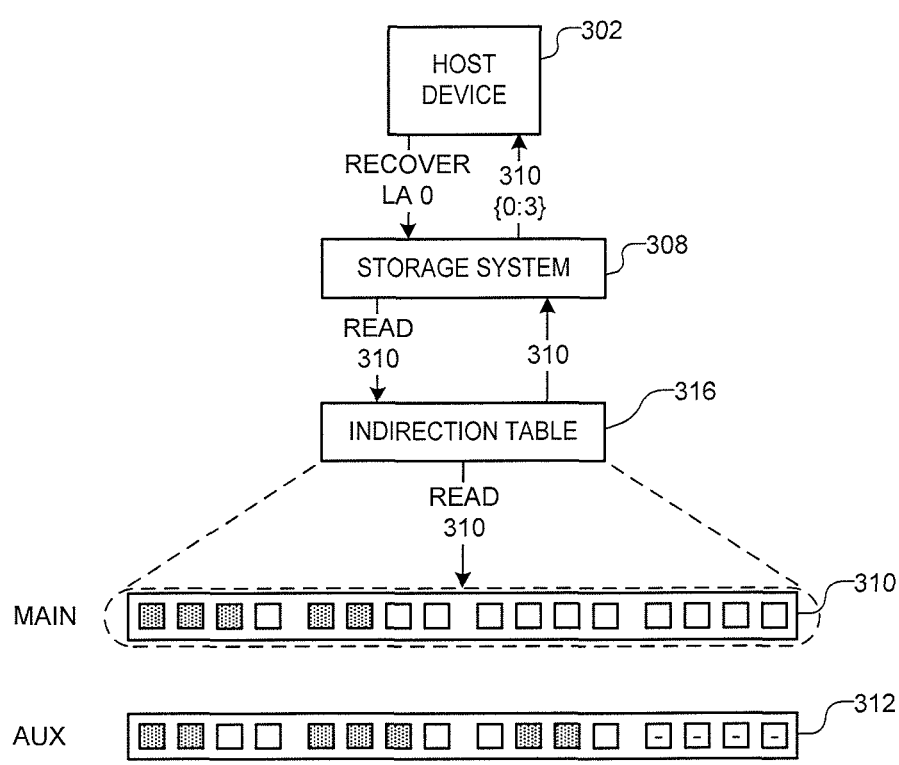
FIG. 3F depicts a simplified signal flow diagram of the data storage device of FIG. 3A ignoring sector redirection in response to a data recovery instruction.

In addition, because the originally-targeted storage sector 310 remains unaltered, it may be possible in a subsequent operation to attempt to recover data from that sector, for example as show in FIG. 3F. For example, as illustrated in FIG. 3F, a host device can issue a recovery command for a particular logical address such as logical address LA-0. In response to the recovery command, the data storage system 308 can return bytes 0 through 3 of the originally-targeted storage sector 310, despite that the indirection table 316 is configured to direct read commands associated with LA-0 to bytes 0 through 3 of the auxiliary sector 312.

Figure 3G:
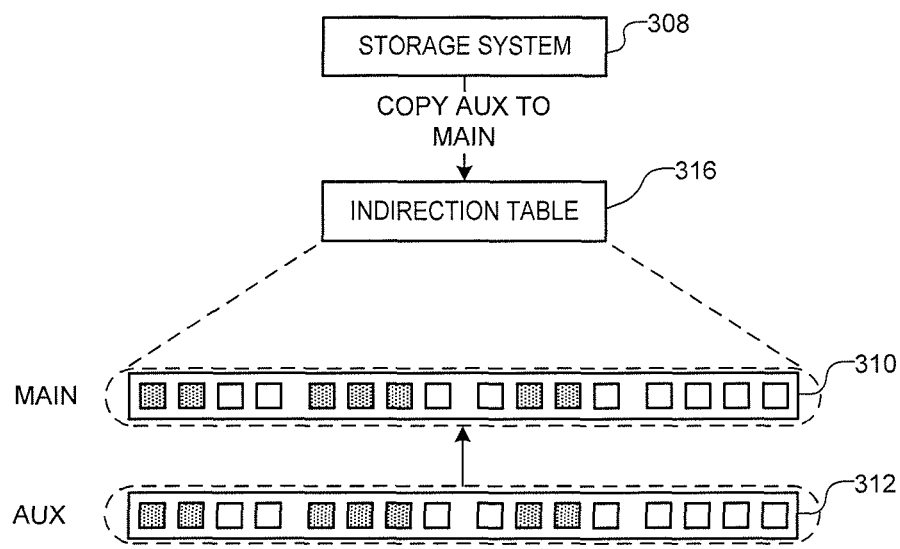
FIG. 3G depicts a simplified signal flow diagram of the data storage device of FIG. 3A copying an auxiliary sector to another location.
Figure 3H:
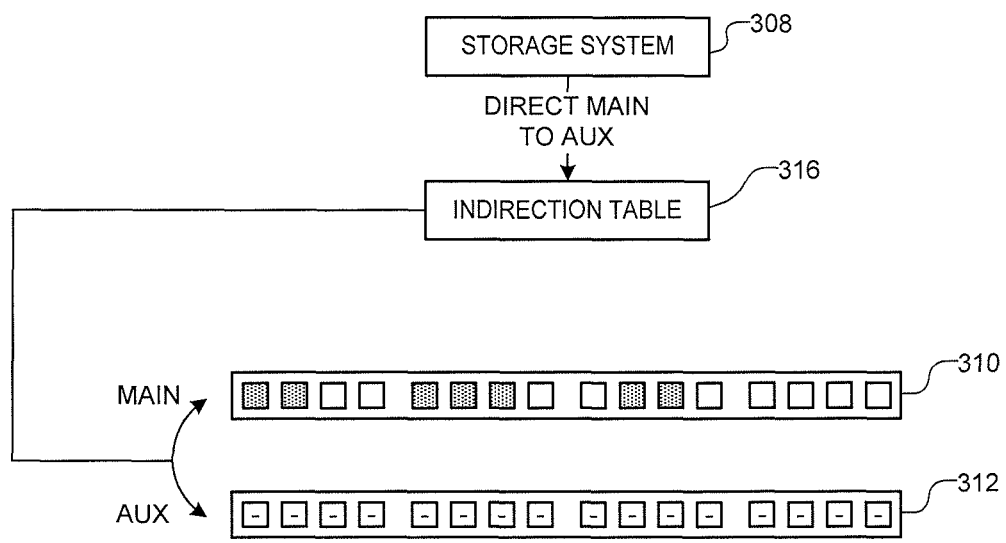
FIG. 3H depicts a simplified signal flow diagram of the data storage device of FIG. 3A performing an update of an indirection table.

For some embodiments described herein, certain data storage systems, such as the data storage system 308, can perform a sector overwrite operation upon determining that all missing runts within a particular storage sector have been populated with new data (for example, as shown in FIG. 3D). To perform the operation, the data storage system may copy all data from the auxiliary sector 312 to the originally-targeted sector 310, as shown in FIG. 3G. In some cases, after data from the auxiliary sector 312 is copied to the originally-targeted sector 310, the auxiliary sector 312 can be erased, released, or otherwise marked as a suitable write location. In other embodiments, an auxiliary sector 312 can be swapped with the originally-targeted sector 310, such as shown in FIG. 3H.

Figure 4A:
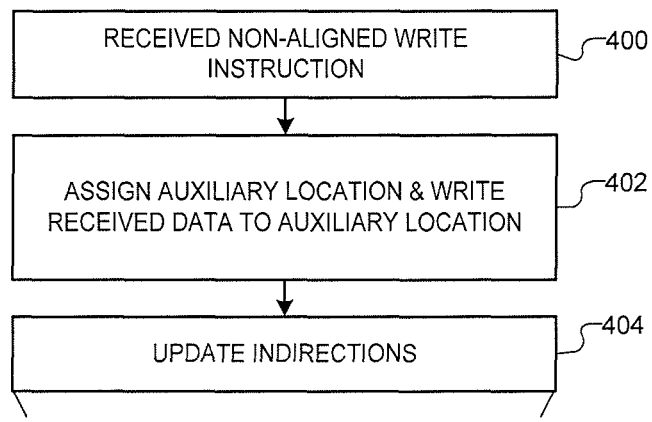
FIG. 4A-4B depicts a flow chart of sample operations of a method of operating a data storage system implementing sector indirection.
Figure 4B:
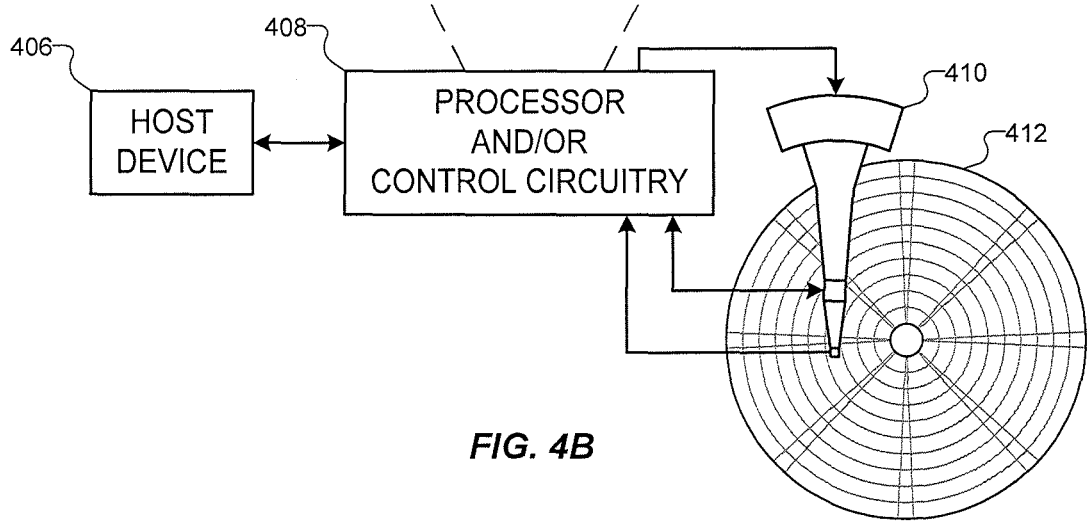

FIG. 4A-4B depicts a flow chart of sample operations of a method of operating a data storage system implementing sector indirection. The method of FIG. 4A can begin at operation 400 at which a non-aligned write instruction is received by a data storage device. Next at operation 402, an auxiliary location can be assigned and the non-aligned data (e.g., runt data) can be written to the auxiliary location. Finally at operation 404, an indirection table can be updated such that future read requests to the non-aligned data will be directed to the auxiliary location.

In many embodiments, the method of FIG. 4A can be implemented by an HDD data storage device, such as depicted by the simplified flow chart of FIG. 4B. As one example, the data storage device can include a processor 408 that can perform or coordinate one or more of the operations of the data storage device. The processor 408 can be connected to a voice coil motor 410 ("VCM") that controls the location of a read head and a write head along a rotatable disk 412 that is formed from a magnetic material. The processor 408 may also communicate with one or more host devices 406.

Figure 5:
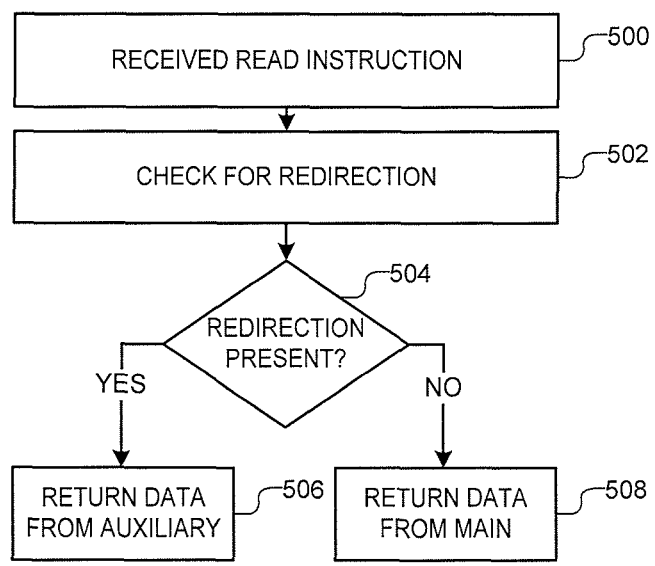
FIG. 5 depicts a flow chart of sample operations of a method of operating a data storage system implementing read/write bifurcated sector indirection.

FIG. 5 depicts a flow chart of sample operations of a method of operating a data storage system implementing read/write bifurcated sector indirection. The method can begin at operation 500 in which a read instruction is received by a data storage device from a smaller sector host. Next, at operation 502, the data storage device can check for a redirection associated with the read requests. For example, in certain embodiments operation 502 can check a bit map, an indirection table, a linked list, a matrix, or any other suitable database or lookup table. Thereafter, if a redirection is determined to be present at operation 504, data can be retrieved from an auxiliary sector of the data storage device at operation 506. Alternatively, if a redirection is not present, data can be retrieved from a main sector of the data storage device at operation 508.

Figure 6:
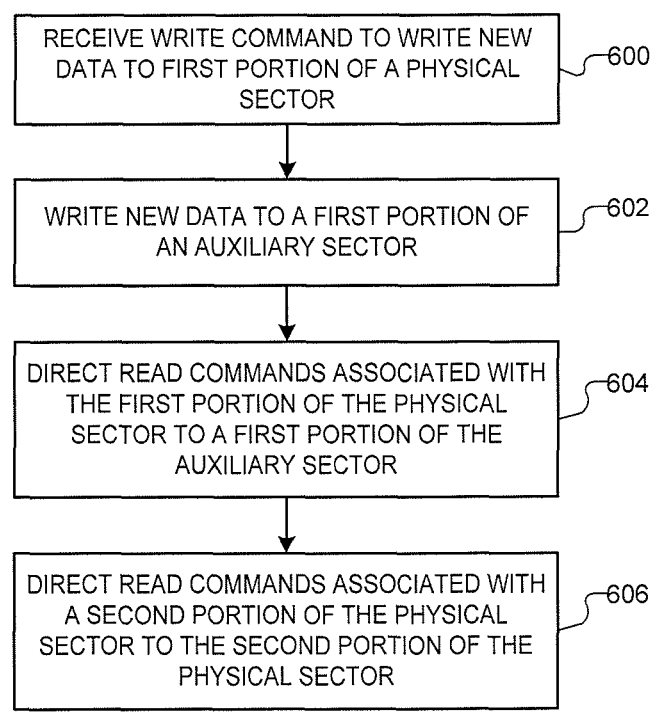
FIG. 6 depicts a flow chart of sample operations of a method of performing sector indirection by a data storage system.

FIG. 6 depicts a flow chart of sample operations of a method of performing sector indirection by a data storage system. The method can begin at operation 600 in which a data storage device receives a write command to write new data to a first portion of a physical sector. In some examples, the first portion of the physical sector may be a runt. Next, at operation 602, the new data can be written to a first portion of an auxiliary sector instead of the first portion of the physical sector. Next at operation 604, all read commands associated with the first portion (e.g., runt) of the physical sector can be redirected to the auxiliary sector. Similarly at operation 606, all read commands associated with a second portion of the physical sector (e.g., missing runt) can be directed to back to the second portion of the physical sector.

Figure 7:
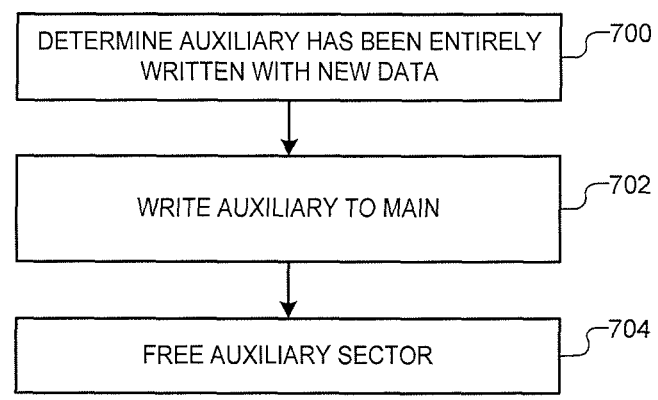
FIG. 7 depicts a flow chart of sample operations of another method of operating a data storage system implementing sector indirection.

FIG. 7 depicts a flow chart of sample operations of another method of operating a data storage system implementing sector indirection. The method can begin at operation 700 in which a data storage device determines that an auxiliary sector has been entirely written with new data. Thereafter, at operation 702, the auxiliary sector can be written (e.g., copied or moved) to a sector within the main physical media associated with the data storage device. Thereafter, at operation 704, the auxiliary sector can be freed.

Figure 8:
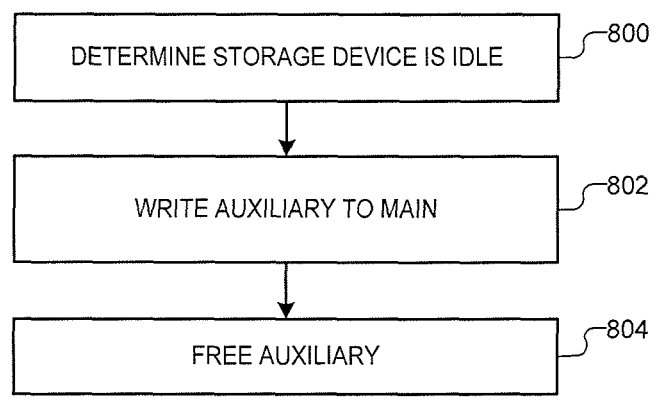
FIG. 8 depicts a flow chart of sample operations of another method of operating a data storage system implementing sector indirection.

FIG. 8 depicts a flow chart of sample operations of another method of operating a data storage system implementing sector indirection. The method can begin at operation 800 in which a data storage device takes an idle state. Next, at operation 802, an auxiliary sector can be written (e.g., copied or moved) to a sector within the main physical media associated with the data storage device. Lastly, at operation 804, the auxiliary sector can be cleared. In this manner, the operation of moving the content of an auxiliary sector occurs transparently to a host device.

Figure 9:
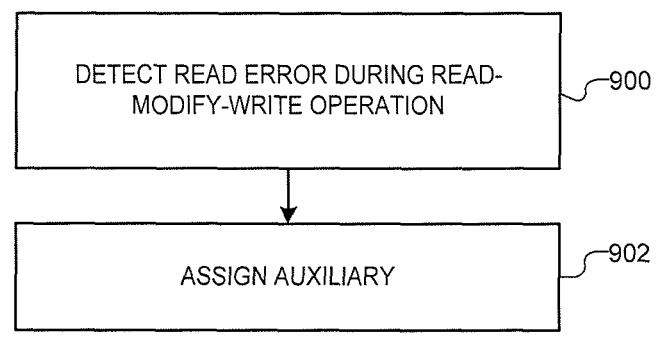
FIG. 9 depicts a flow chart of sample operations of a method of improving failure tolerance of non-aligned write commands within a data storage system.

FIG. 9 depicts a flow chart of sample operations of a method of improving failure tolerance of non-aligned write commands within a data storage system. The method can begin at operation 900 in which a read error is detected by a data storage device during a read-modify-write operation associated with a non-aligned write command received from a host device that uses a smaller sector size than that used by the data storage system. Thereafter, at operation 902, an auxiliary space (e.g., auxiliary sector) can be assigned in order to perform read/write indirection and/or bifurcation in accordance with many embodiments described herein.

In other embodiments related to the example method shown in FIG. 9, additional auxiliary space can be assigned if additional missing runt read errors are detected. For example, in certain embodiments, if a missing runt read error occurs when attempting to read a missing runt contained within an auxiliary sector, a second auxiliary sector can be assigned.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

We claim:

1. A method for writing data to a physical sector of a data storage system, the method comprising:
   receiving a write instruction to write new data to a first portion of the physical sector, wherein the physical sector is larger than a logical sector size used by a host system that sends the write instruction to the data storage system and the data storage system is configured to read and write an entire physical sector; and
   upon detection of an error while attempting to read data of a second portion of the physical sector outside of the first portion,
      writing the new data to a first portion of an auxiliary location separate from the physical sector;
      directing read instructions associated with the first portion of the physical sector to the first portion of the auxiliary location; and
      directing read instructions associated with the second portion of the physical sector to the second portion of the physical sector.

2. The method of claim 1, further comprising directing write instructions associated with the second portion of the physical sector to a second portion of the auxiliary location.

3. The method of claim 2, wherein directing write instructions associated with the second portion of the physical sector to the second portion of the auxiliary location comprises:
   receiving a write instruction to write new data to a sub-portion of the second portion of the physical sector;
   writing the new data to a sub-portion of the auxiliary location; and
   directing read instructions associated with the sub-portion of the second portion of the physical sector to the sub-portion of the auxiliary location.

4. The method of claim 1, further comprising copying all data from the first and second portions of the auxiliary location to the physical sector upon determining that the second portion of the auxiliary location has been entirely written with new data.

5. The method of claim 1, further comprising copying all data from the first and second portions of the auxiliary location to the physical sector upon determining that the data storage system is idle.

6. The method of claim 1, further comprising re-reading the second portion of the physical sector to recover the data.

7. The method of claim 6, further comprising:
   in the event the re-reading operation is successful, copying the first portion of the auxiliary location to the first portion of the physical sector; and
   directing all read instructions associated with the first portion of the physical sector to the first portion of the physical sector.

8. The method of claim 1, wherein directing read instructions associated with the first portion of the physical sector to the first portion of the auxiliary location comprises mapping the physical location of the first portion to the physical location of the first portion of the auxiliary location.

9. A data storage system comprising: a storage location comprising:
   a physical sector; and
   an auxiliary sector; and
   a controller configured to:
   receive a write instruction to write new data to a first plurality of blocks of the physical sector, wherein the physical sector is larger than a logical sector size used by a host system that sends the write instruction to the data storage system and the data storage system is configured to read and write an entire physical sector;
   write the new data to a first plurality of blocks of the auxiliary sector;
   redirect read instructions associated with the first plurality of blocks of the physical sector to the first plurality of blocks of the auxiliary sector;
   redirect write instructions associated with a second plurality of blocks of the physical sector to a second plurality of blocks of the auxiliary sector; and
   move the first and second plurality of blocks of the auxiliary sector to the first and second plurality of blocks of the physical sector, respectively, upon determining that the second plurality of blocks of the auxiliary sector contains new data.

10. The data storage system of claim 9, wherein the data storage system comprises a magnetic recording system.

11. The data storage system of claim 9, wherein moving the first and second plurality of blocks of the auxiliary sector to the first and second plurality of blocks of the physical sector, respectively, is performed upon determining that the data storage system is idle.

12. The data storage system of claim 9, wherein the auxiliary sector comprises capacity at least equal to the combined capacity of the first and second plurality of blocks of the physical sector.

13. The data storage system of claim 9, wherein the second plurality of blocks of the physical sector has a smaller capacity than the first plurality of blocks of the physical sector.

14. The data storage system of claim 9, wherein the operation of directing write instructions associated with the second plurality of blocks of the physical sector to the second plurality of blocks of the auxiliary sector comprises:
receiving a write instruction to write new data to a block of the second plurality of blocks of the physical sector;
writing the new data to a block of the auxiliary sector; and
directing read instructions associated with the block of the second plurality of blocks of the physical sector to the block of the auxiliary sector.

15. The data storage system of claim 9, further comprising:
a plurality of physical sectors; and
a plurality auxiliary sectors.

16. The data storage system of claim 9, further comprising writing a known pattern to the auxiliary sector prior to writing to the first plurality of blocks.

17. A controller for managing a data storage device associated with a data storage system, the controller configured to:
receive a write instruction to write new data to a first portion of a physical sector of the data storage device, wherein the physical sector is larger than a logical sector size used by a host system that sends the write instruction and the data storage system is configured to read and write an entire physical sector;
write the new data to a first portion of an auxiliary location;
direct read instructions associated with the first portion of the physical sector to the first portion of the auxiliary location;
direct write instructions associated with a second portion of the physical sector to a second portion of the auxiliary location; and
move the first and second portions of the auxiliary location to the first and second portions of the physical sector, respectively, upon determining that the second portion of the auxiliary location contains new data.

18. The controller of claim 17, wherein directing write instructions associated with the second portion of the physical sector to the second portion of the auxiliary location comprises:
receiving a write instruction to write new data to a sub-portion of the second portion of the physical sector;
writing the new data to a sub-portion of the auxiliary location; and
directing read instructions associated with the sub-portion of the second portion of the physical sector to the sub-portion of the auxiliary location.

19. A method for managing a data storage device associated with a data storage system, the method comprising:
receiving a write instruction to write runt data to a physical sector of the data storage device; and
performing a read-modify-write operation with the physical sector, the read-modify-write operation comprising:
reading the physical sector to obtain missing runt data;
modifying the physical sector to include the runt data and the missing runt data;
writing the physical sector back to the data storage device;
wherein upon receiving an error when performing the operation of reading the physical sector to obtain missing runt data: writing the runt data to a first auxiliary sector;
directing read requests of the runt data to the first auxiliary sector;
directing write requests over the missing runt data to the physical sector; and
directing read requests of the missing runt data to the physical sector.

20. The method of claim 19, wherein upon receiving an error when performing a read-modify-write operation to write missing runt data to the auxiliary sector, writing the missing runt data to a second auxiliary sector.

* * * * *